(12) United States Patent
Maeda (10) Patent No.: US 10,663,849 B2
(45) Date of Patent: May 26, 2020

(54) POLARIZATION BEAM SPLITTER AND IMAGE PROJECTION APPARATUS USING THE SAME

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 3 days.

(21) Appl. No.: 16/140,602

(22) Filed: Sep. 25, 2018

(65) Prior Publication Data
US 2019/0101815 A1 Apr. 4, 2019

(30) Foreign Application Priority Data
Sep. 29, 2017 (JP) ................. 2017-191758

(51) Int. Cl.
| G03B 21/14 | (2006.01) |
| G03B 21/20 | (2006.01) |
| G02B 27/09 | (2006.01) |
| G02B 27/12 | (2006.01) |
| G02B 27/28 | (2006.01) |

(52) U.S. Cl.
CPC ..... *G03B 21/2073* (2013.01); *G02B 27/0972* (2013.01); *G02B 27/126* (2013.01); *G02B 27/283* (2013.01); *G03B 21/142* (2013.01); *G03B 21/2066* (2013.01)

(58) Field of Classification Search
CPC .. G03B 21/142; G03B 21/2073; G02B 7/022; G02B 27/0955; G02B 27/283; G02B 27/126; G02B 27/0972

USPC ................ 353/100, 101, 81; 359/811, 819
See application file for complete search history.

(56) References Cited

U.S. PATENT DOCUMENTS

| 7,553,025 B2* | 6/2009 | Hirata .................. G02B 5/3058 |
| | | 348/338 |
| 7,612,939 B2 | 11/2009 | Kato et al. |
| 8,542,441 B2* | 9/2013 | Ouderkirk ............ G02B 27/141 |
| | | 359/485.01 |
| 2003/0048423 A1 | 3/2003 | Aastuen et al. |
| 2011/0216396 A1* | 9/2011 | Ouderkirk ............ G02B 27/141 |
| | | 359/352 |
| 2012/0268718 A1* | 10/2012 | Kobayashi ........... G02B 27/285 |
| | | 353/20 |

FOREIGN PATENT DOCUMENTS

| DE | 10315688 A1 | 11/2004 |
| JP | 2001215491 A | 8/2001 |

(Continued)

OTHER PUBLICATIONS

Combined Search and Examination Report issued in GB Application No. 1815623.2 dated Mar. 22, 2019.

*Primary Examiner* — William C. Dowling
(74) *Attorney, Agent, or Firm* — Rossi, Kimms & McDowell LLP (57) ABSTRACT

A polarization beam splitter includes: a first prism; a second prism; a polarization beam split portion in contact with the second prism; a substrate provided between the polarization beam split portion and the first prism; a first adhesive portion provided between the first prism and the substrate; and a second adhesive portion provided between the polarization beam split portion and the substrate.

15 Claims, 6 Drawing Sheets

(56) References Cited

FOREIGN PATENT DOCUMENTS

| | | |
|---|---|---|
| JP | 2006195301 A | 7/2006 |
| JP | 2007133164 A | 5/2007 |
| JP | 2015045725 A | 3/2015 |

* cited by examiner

POLARIZATION BEAM SPLITTER AND IMAGE PROJECTION APPARATUS USING THE SAME

BACKGROUND OF THE INVENTION

Field of the Invention

The present invention relates to a polarization beam splitter and an image projection apparatus using the same.

Description of the Related Art

As a polarization beam splitter for an image projection apparatus using a refractive optical modulation portion, a polarization beam splitter described in Japanese Patent Application Laid-Open No. 2015-45725 is known. The polarization beam splitter described in Japanese Patent Application Laid-Open No. 2015-45725 has a structure in which two parallel flat plates provided with a polarizing beam split film in between are sandwiched by two prisms. The two parallel flat plates are made of spinel, which has a high thermal conductivity.

In other words, the polarization beam splitter described in Japanese Patent Application Laid-Open No. 2015-45725 is capable of suppressing an increase in temperature of the polarizing beam split film by sandwiching the polarizing beam split film with the parallel flat plates made of a material having a high thermal conductivity. As a result, it is possible to suppress a temperature distribution generated by the light absorption of the polarizing beam split film, and to thus suppress black floating and color unevenness, which are generated by the polarization disturbance caused by the birefringence attributable to the internal stress, which is generated by this temperature distribution.

Here, consider a case where the polarization beam splitter described in Japanese Patent Application Laid-Open No. 2015-45725 is arranged inside an image projection apparatus such that light from a refractive optical modulation portion is reflected by the polarization beam splitter to be guided into a projection optical system. In this case, if the material of the parallel flat plates and the material of the prisms have large refractive indices, the light guided into the projection optical system is influenced by the difference in refractive index between the material of the parallel flat plates and the material of the prisms, possibly increasing the aberration and thus leading to deterioration of the image quality of the projected image.

SUMMARY OF THE INVENTION

In view of this, an object of the present invention is to provide a polarization beam splitter capable of suppressing an influence of the polarization beam splitter on an image quality more than ever while suppressing increase in temperature of a polarization beam split portion, and an image projection apparatus using the polarization beam splitter.

To achieve the above-described object, a polarization beam splitter according to the present invention includes: a first prism; a second prism; a polarization beam split portion in contact with the second prism; a substrate provided between the polarization beam split portion and the first prism; a first adhesive portion provided between the first prism and the substrate; and a second adhesive portion provided between the polarization beam split portion and the substrate. Furthermore, to achieve the above-described object, an image projection apparatus according to the present invention includes: a light source portion capable of emitting light containing a first color light beam, a second color light beam, and a third color light beam which have wavelengths different from each other; the polarization beam splitter described above; a refractive optical modulation portion; and a retaining portion capable of retaining a projection optical system that guides light from the refractive optical modulation portion to a projection surface; wherein the polarization beam splitter is arranged such that light from the light source portion passes through the polarization beam splitter and is incident on the refractive optical modulation portion, and light modulated by the refractive optical modulation portion is reflected by the polarization beam splitter.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings. Each of the embodiments of the present invention described below can be implemented solely or as a combination of a plurality of the embodiments or features thereof where necessary or where the combination of elements or features from individual embodiments in a single embodiment is beneficial.

First Embodiment (Configuration of Image Projection Apparatus)

Figure 1:
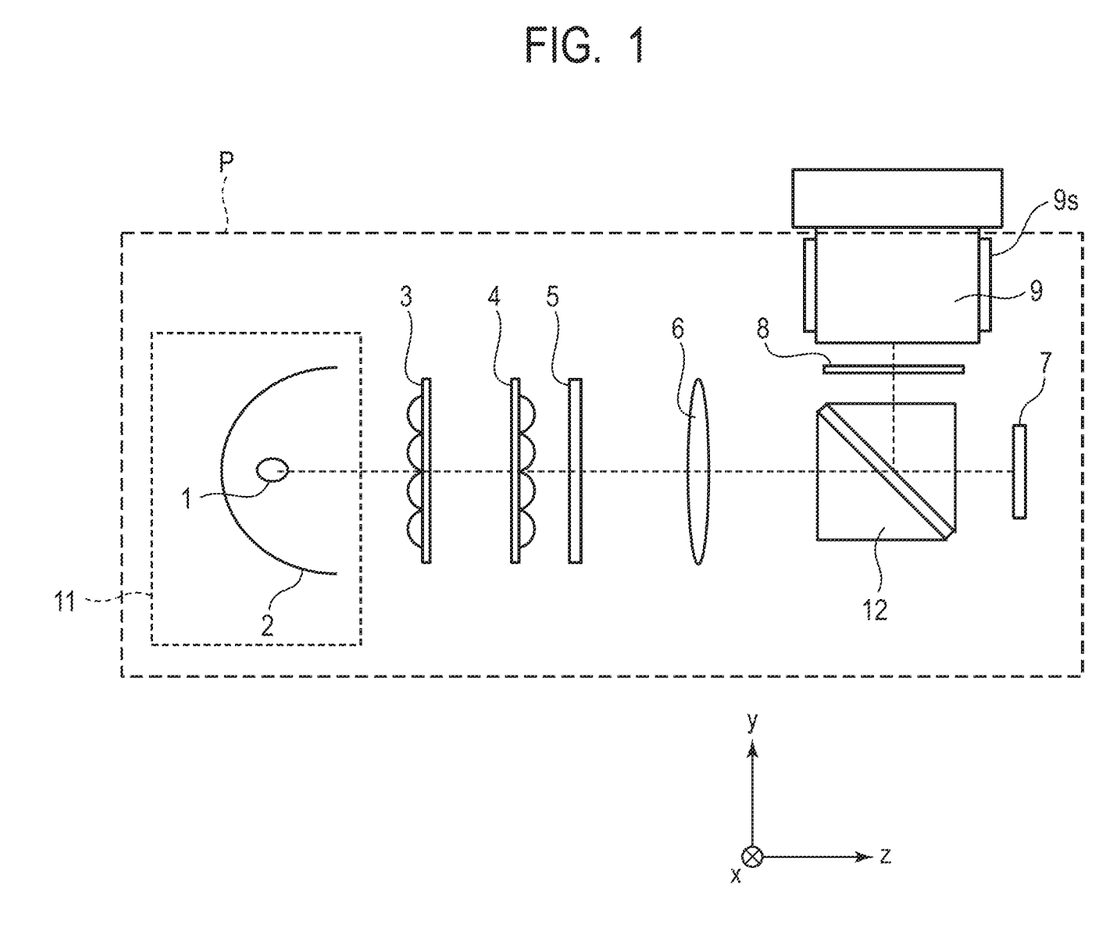
FIG. 1 is a diagram illustrating a configuration of an image projection apparatus in a First Embodiment.

A configuration of a projector (image projection apparatus) P in this embodiment will be described using FIG. 1. The projector P includes a light source portion 11, an illumination optical system, a polarization beam splitter 12, an image display element (refractive optical modulation portion) 7, a polarizing plate 8, a projection lens (projection optical system) 9, and a retaining portion 9s.

The light source portion 11 includes a light source 1 such as an extra-high pressure mercury lamp or a xenon lamp and a reflector 2 which reflects light from the light source 1. The light source portion 11 is capable of emitting light containing a first color light beam, a second color light beam, and a third color light beam which have wavelengths different from each other. More specifically, the light source portion 11 is capable of emitting white light containing red light, green light, and blue light.

The light from the light source portion 11 is incident on a first microlens array (or fly-eye lens) 3, where the light is split into a plurality of light beams and condensed. The plurality of light beams thus split pass through a second microlens array (or fly-eye lens) 4 and form a plurality of images of the light source. Near the positions at which the images of the light source are formed, a polarization conversion element 5 is provided. The plurality of light beams, as unpolarized light, incident on the polarization conversion element 5 are converted into polarized light having a given polarization direction (which is herein assumed to be P polarization) by the polarization conversion element 5 and are incident on a condenser lens 6. The light from the condenser lens 6 passes through the polarization beam splitter 12, which is a polarization separating means (P polarization transmission, S polarization reflection), and is condensed on the image display element 7. It should be noted that in each Embodiment of the present invention, the first microlens array, the second microlens array, the polarization conversion element, and the condenser lens are collectively referred to as an illumination optical system.

The light modulated by the image display element 7 is reflected by the polarization beam splitter 12, passes through the polarizing plate 8, and is projected via the projection lens 9 onto a screen (projection surface), which is not illustrated. The projection lens 9 is retained by the retaining portion 9s. In other words, the retaining portion 9s is capable of retaining the projection lens 9. The projection lens 9 may be detachable or may be non-detachable from the retaining portion 9s.

(Configuration of Polarization Beam Splitter)

Next, a configuration of the polarization beam splitter (hereinafter referred to as the PBS) 12 in this embodiment will be described using FIG. 2. The PBS 12 includes a first prism 21, a substrate 23, a second prism 22, a first adhesive (first adhesive portion) 24, a second adhesive (second adhesive portion) 25, and a polarizing beam split film (polarization beam split portion) 26.

The substrate 23 is bonded to a surface 21a of the first prism on the substrate 23 side by the first adhesive 24. The polarizing beam split film 26 is vapor-deposited on a surface 22a of the second prism 22 on the substrate 23 side (the second adhesive 25 side). The substrate 23 is bonded to the surface 22a, on which the polarizing beam split film 26 has been vapor-deposited, by the second adhesive 25. In other words, the first adhesive 24 is in contact with the first prism 21 and the substrate 23, the substrate 23 is in contact with the first adhesive 24 and the second adhesive 25, and the polarizing beam split film 26 is in contact with the second adhesive 25 and the second prism 22.

Figure 2:
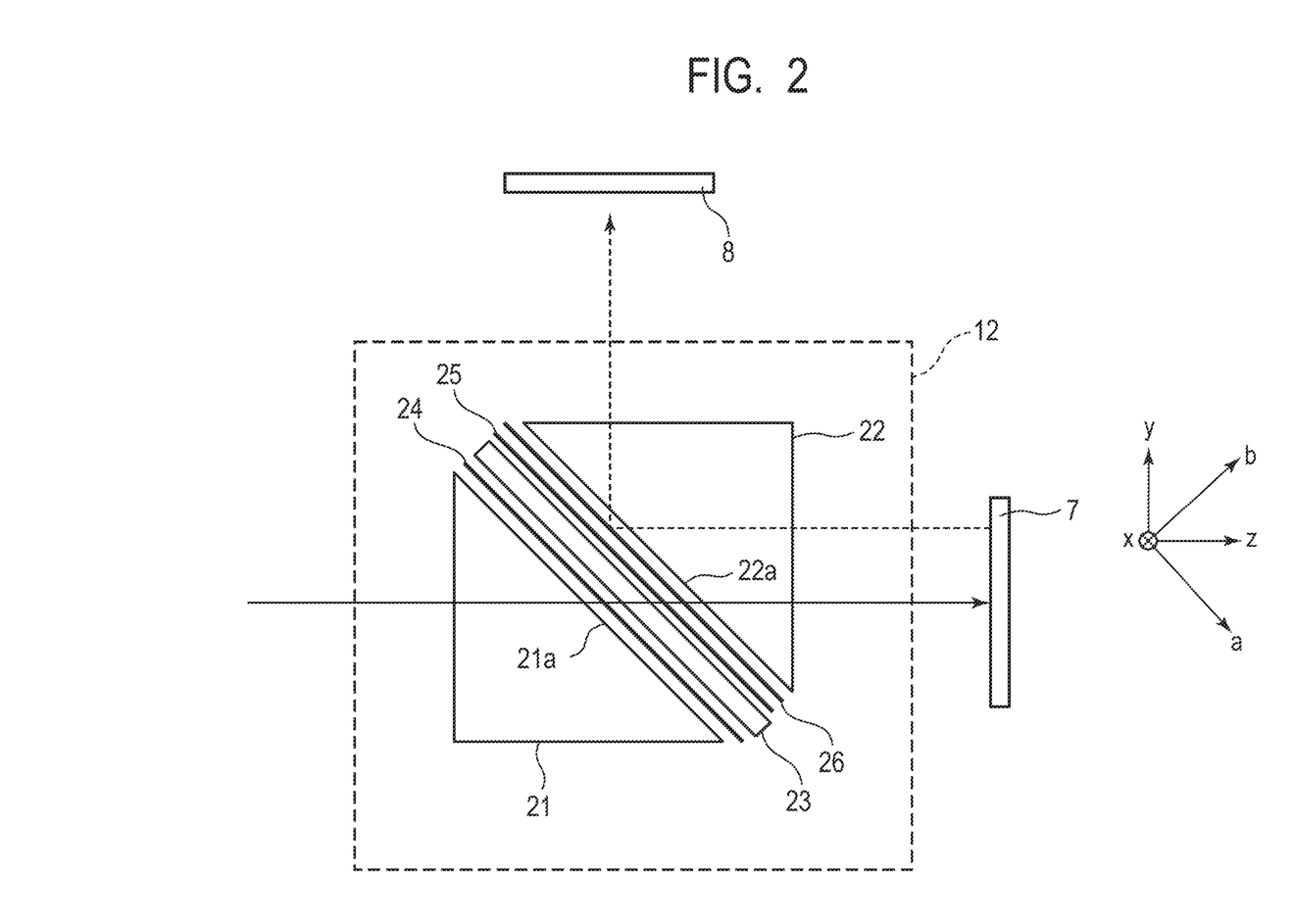
FIG. 2 is a diagram illustrating a configuration of a polarization beam splitter 12 in the First Embodiment.

In FIG. 2, the solid arrow indicates an optical path through which light that is incident on the PBS 12 from the light source portion 11 is then incident on the image display element 7, and the dashed arrow indicates an optical path through which light from the image display element 7 passes. As illustrated in FIG. 2, the PBS 12 is capable of guiding, to the image display element 7, the light that is incident on the first prism 21 from a first direction and passes through the first adhesive 24, the substrate 23, the second adhesive 25, the polarizing beam split film 26, and the second prism 22. At the same time, the PBS 12 is capable of guiding the light from the image display element 7 to a second direction which is different from the first direction. To put it differently, the PBS 12 is arranged inside the projector P in such a manner as to achieve such optical action. The first direction mentioned herein is a direction indicated by the solid arrow in FIG. 2, or the z-axis direction, and the second direction is a direction indicated by the dashed arrow, or the y-axis direction.

With the PBS 12 is configured as described above, the image light from the image display element 7 is reflected by the polarizing beam split film 26 on the surface 22a of the second prism 22, and is thus guided to the projection lens 9 without traveling via the first prism 21 and the substrate 23.

In the polarization beam splitter described in Japanese Patent Application Laid-Open No. 2015-45725 mentioned above, the polarizing beam split film is sandwiched by two parallel flat plates. For this reason, in the polarization beam splitter described in Japanese Patent Application Laid-Open No. 2015-45725, when image light from the image display element is reflected by the polarizing beam split film to be guided to the projection lens, the image light is incident on both of the prism and the parallel flat plates. As a result, there is a possibility that the image light be influenced by the difference in refractive index between them, increasing the aberration.

In contrast, in the PBS 12 in this embodiment, image light from the image display element 7 travels only via the second prism 22 and the polarizing beam split film 26 without traveling via the first prism 21 and the substrate 23 as described above. For this reason, even when materials having difference refractive indices are used for the first prism 21 or second prism 22 and the substrate 23, it is possible to suppress the generation of aberration and to suppress the influence by the polarization beam splitter on the image quality, as compared with the polarization beam splitter described in Japanese Patent Application Laid-Open No. 2015-45725.

In addition, the substrate 23 makes it also possible to suppress an increase in temperature in the polarizing beam split film 26, which occurs because the polarizing beam split film 26 absorbs the light incident on the PBS 12. More specifically, it is possible to efficiently disperse, via the substrate 23, heat generated in each adhesive and the polarizing beam split film 26. As a result, temperature distribution generated in the PBS 12 is reduced, thus making it possible to reduce deterioration in resolution performance due to black floating and glass deformation attributable to photoelasticity, generated in the second prism 22.

(More Desirable Configuration)

Hereinafter, a more desirable configuration will be described.

(Material Properties of Substrate)

To further suppress an increase in temperature in the polarizing beam split film 26, it is preferable that the substrate 23 have a high thermal conductivity. Specifically, it is preferable the PBS 12 satisfy $$A \geq 4.0 \tag{1}$$

where $A$ (W/(m·K)) denotes the thermal conductivity of the substrate 23.

It is more preferable that the PBS 12 satisfy $$A \geq 20.0 \tag{1a}$$

In addition, to further suppress an increase in temperature in the polarizing beam split film 26, it is preferable that the substrate 23 absorb less heat. Specifically, it is preferable that the PBS 12 satisfy $$P \leq 0.02 \tag{2}$$

where P denotes the internal absorptance of the material in a case where the material used for the substrate 23 has a thickness of 10 mm and light having a wavelength of 460 nm is incident on the material.

Moreover, while the glass material of the first prism 21 and the second prism 22 may be a general glass used for lenses and the like, it is preferable that the substrate 23 be made of quartz or sapphire having a low absorptance for visible light and a high thermal conductivity.

(Material Properties of Prism)

In a projector having a high luminance of more than 3000 lm, it is preferable that, besides using a material having a high thermal conductivity such as quartz or sapphire as the material of the substrate 23, the glass material of the first prism 21 and the second prism 22 be appropriately selected.

More specifically, it is preferable that the PBS 12 satisfy at least one of $$0.4 \leq H1 \leq 2.0 \quad (3)$$

and $$0.4 \leq H2 \leq 2.0 \quad (4)$$

where H1 (W/(m·K)) denotes the thermal conductivity of the first prism 21 and H2 (W/(m·K)) denotes the thermal conductivity of the second prism 22. Particularly, it is more preferable that the second prism 22 on which light from the image display element 7 is incident satisfy the above-described Expression (4).

If the thermal conductivity of the prism is lower than the lower limit value of Expression (4), there is a possibility that an increase in temperature in the polarizing beam split film 26 cannot be sufficiently suppressed when the luminance of light from the light source portion 11 is high. On the other hand, many glass materials that have a thermal conductivity higher than the upper limit value of Expression (4) are too costly, and are thus not preferable.

It is more preferable that the PBS 12 satisfy at least one of $$0.6 \leq H1 \leq 1.5 \quad (3a)$$

and $$0.6 \leq H2 \leq 1.5 \quad (4a).$$

It is preferable that the PBS 12 satisfy $$|N2-N1| \leq 0.1 \quad (5)$$

where N1 denotes the refractive index of the first prism 21 for the d-line and N2 denotes the refractive index of the second prism 22 for the d-line. It is more preferable that the PBS 12 satisfy $$|N2-N1| \leq 0.03 \quad (5a)$$

If the difference in refractive index between the two prisms is too large to satisfy Expression (5), there is a possibility that aberration such as astigmatism, which is generated by the difference in refractive index between them, increases to lower the illumination efficiency.

Here, the photoelastic constant and the internal absorptance of the first prism 21 are denoted by B1 ($10^{-6}$ mm$^2$/N) and Q1 (where light having a wavelength of 460 nm is incident on the first prism having a thickness of 10 mm), respectively. In addition, the photoelastic constant and the internal absorptance of the second prism 22 are denoted by B2 ($10^{-6}$ mm$^2$/N) and Q2 (where light having a wavelength of 460 nm is incident on the second prism having a thickness of 10 mm), respectively. In this case, it is desirable that the PBS 12 satisfy $$B1 \leq 2.0 \quad (6)$$

$$B2 \leq 1.0 \quad (7)$$

$$Q1 \leq 0.03 \quad (8)$$

$$Q2 \leq 0.02 \quad (9).$$

If the PBS 12 fails to satisfy Expression (6), there is a possibility that disturbance in polarization occurs in the first prism 21 due to the photoelasticity to lower the transmittance of the polarizing beam split film 26, thus lowering the illumination efficiency. Note that the upper limit value of the Conditional Expression (7) may be set to 2.0. In addition, the upper limit value of the Conditional Expression (9) may be set to 0.03.

If the PBS 12 fails to satisfy Expression (7), there is a possibility that black floating occurs in the second prism 22 due to the photoelasticity. If the PBS 12 fails to satisfy Expression (8), there is a possibility that temperature distribution occurs in the first prism 21 due to the absorption, and disturbance in polarization occurs due to the photoelasticity to lower the transmittance of the polarizing beam split film 26, thus lowering the illumination efficiency. If the PBS 12 fails to satisfy Expression (9), there is a possibility that temperature distribution occurs in the second prism 22 due to absorption, and deterioration in resolution performance occurs due to black floating and glass deformation attributable to the photoelasticity.

It is more preferable that the PBS 12 satisfy $$B1 \leq 1.6 \quad (6a)$$

$$B2 \leq 0.8 \quad (7a)$$

$$Q1 \leq 0.018 \quad (8a)$$

$$Q2 \leq 0.01 \quad (9a).$$

Note that the upper limit value of the Conditional Expression (7a) may be set to 1.6. In addition, the upper limit value of the Conditional Expression (9a) may be set to 0.018.

In addition, as described above, since image light from the image display element 7 is guided to the projection lens 9 via the second prism 22, it is preferable that the second prism 22 have a lower photoelastic constant and also a lower internal absorptance than those of the first prism 21. In other words, it is preferable that the PBS 12 satisfy at least one of $$B1 \geq B2 \quad (10)$$

and $$Q1 \geq Q2 \quad (11).$$

(Numerical Embodiments)

Hereinafter, Numerical Embodiments of the polarization beam splitter are shown.

(Numerical Embodiment 1)

First prism: SF6HT (SCHOTT)

H1=0.673, N1=1.805, B1=0.65, Q1=0.008

Second prism: SF6HT (SCHOTT)

H2=0.673, N2=1.805, B2=0.65, Q2=0.008

Substrate: sapphire

A=25

(Numerical Embodiment 2)

First prism: S-FPM2 (OHARA)

H1=0.624, N1=1.595, B1=0.51, Q1=0.008

Second prism: S-FPM2 (OHARA)

H2=0.624, N2=1.595, B2=0.51, Q2=0.008

Substrate: sapphire

A=25

(Numerical Embodiment 3)

First prism: S-FPM2 (OHARA)

H1=0.624, N1=1.595, B1=0.51, Q1=0.008

Second prism: LBC3N (HOYA)

H2=0.443, N2=1.606, B2=0.43, Q2=0.009

Substrate: sapphire
A=25
(Numerical Embodiment 4)
First prism: S-LAH89 (OHARA)
H1=0.861, N1=1.852, B1=1.27, Q1=0.017
Second prism: PBH56 (OHARA)
H2=0.635, N2=1.841, B2=0.09, Q2=0.005
Substrate: sapphire
A=25
(Numerical Embodiment 5)
First prism: S-LAH97 (OHARA)
H1=0.863, N1=1.755, B1=1.39, Q1=0.003
Second prism: S-LAH97 (OHARA)
H2=0.863, N2=1.755, B2=1.39, Q2=0.003
Substrate: sapphire
A=25

Note that the result of calculation of Expression (5) in each Numerical Embodiment is as shown in the following Table 1.

TABLE 1

|  | Numerical Embodiment | | | | |
| --- | --- | --- | --- | --- | --- |
|  | 1 | 2 | 3 | 4 | 5 |
| N2 | 1.805 | 1.595 | 1.606 | 1.841 | 1.755 |
| N1 | 1.805 | 1.595 | 1.595 | 1.852 | 1.755 |
| \|N2 − N1\| | 0 | 0 | 0.011 | 0.011 | 0 |

(Direction of Slow Axis of Substrate)

Figure 3A:
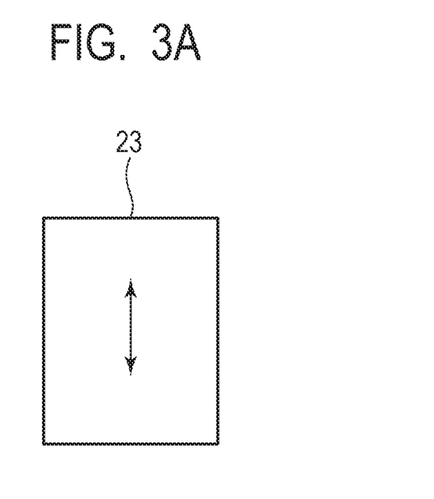
FIGS. 3A and 3B are diagrams illustrating a direction of a slow axis of a substrate 23 in the First Embodiment.
Figure 3B:
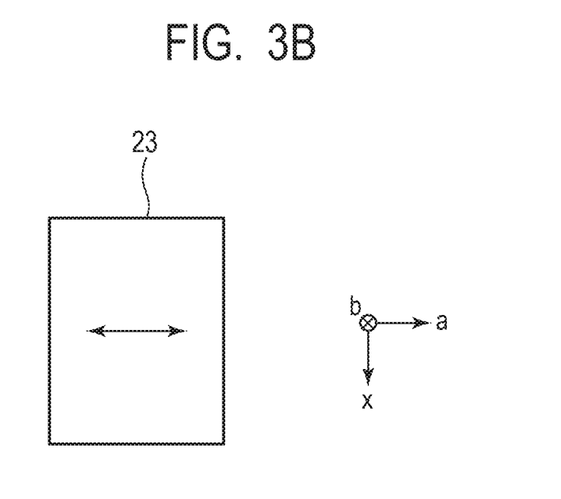

FIGS. 3A and 3B show the direction of the slow axis of the substrate 23. In FIG. 2 and FIGS. 3A and 3B, the z-axis direction is a direction that is parallel with the normal direction of the image display element 7, and the y-axis direction is a direction that is orthogonal to the z-axis direction and in which light from the PBS 12 travels. The x-axis direction is a direction that is orthogonal to the z-axis direction and to the y-axis direction. The b-axis direction is a direction that is parallel with the normal direction of the substrate 23, and the a-axis direction is a direction that is orthogonal to the x-axis direction and to the b-axis direction and is parallel with the incidence plane of the substrate 23 and with the direction of the short side of the substrate 23.

It is preferable that the direction of the slow axis of the substrate 23 having birefringence be substantially parallel with the x-axis direction or the a-axis direction as illustrated in FIGS. 3A and 3B. The expression "substantially parallel" means that the angle of the slow axis relative to the x axis or the a axis is 0°±5°. If this range of "substantially parallel" is not satisfied, too much phase difference is given to the polarized light (whose polarization direction is parallel with the x axis or the y axis) incident on the PBS 12, leading to an increase in loss of the illumination light at the PBS 12.

The direction of the slow axis of the substrate 23 may be expressed as follows using the polarization direction of the incident light onto the PBS 12. Specifically, the angle made by the slow axis of the substrate 23 relative to the polarization direction of the incident light incident on the polarizing beam split film 26 is within a range of 0°±5° or 90°±5°.

In addition, it is preferable that the PBS 12 satisfy $$|Ne-No| \geq 0.004 \qquad (12)$$

where Ne denotes the refractive index of the substrate 23 for the ordinary ray of d-line and No denotes the refractive index of the substrate 23 for the extraordinary ray of d-line.

As described above, in this embodiment, the light modulated by the image display element 7 and guided to the screen, that is, the image light, is guided from the image display element 7 via the second prism 22 and the polarizing beam split film 26, and so from the PBS 12 to the screen, or in the direction of the projection lens 9 (the second direction). In this way, the image light is emitted from the PBS 12 without traveling via the substrate 23 or via the adhesive portions. For this reason, even if the first adhesive portion 24 or the second adhesive portion 25 deteriorated, the image light would not be affected by the deterioration.

In addition, the configuration in which the image light is guided from the PBS 12 to the screen or in the direction of the projection lens 9 (the second direction) via the second prism 22 and the polarizing beam split film 26 is in common between the PBS described in this embodiment and a normal PBS. The normal PBS mentioned herein refers to a PBS in which a polarizing beam split film is sandwiched by two prisms without including a substrate. In the PBS described in Japanese Patent Application Laid-Open No. 2015-45725 mentioned above, it is necessary to design the polarizing beam split film by taking into consideration the refractive indices of both of the substrate and the prism on the image display element side rather than the polarizing beam split film. However, the polarizing beam split film mounted in the PBS described in this embodiment may be one that takes into consideration the refractive index of the prism on the image display element side, like a polarizing beam split film to be mounted in a normal PBS. In other words, the PBS described in this embodiment can use a polarizing beam split film mounted in the normal PBS.

Moreover, since this embodiment does not employ the configuration in which a polarizing beam split film is sandwiched by two substrates, it is possible to achieve a PBS having a simpler configuration than that of the PBS described in Japanese Patent Application Laid-Open No. 2015-45725 mentioned above.

Second Embodiment

Figure 4:
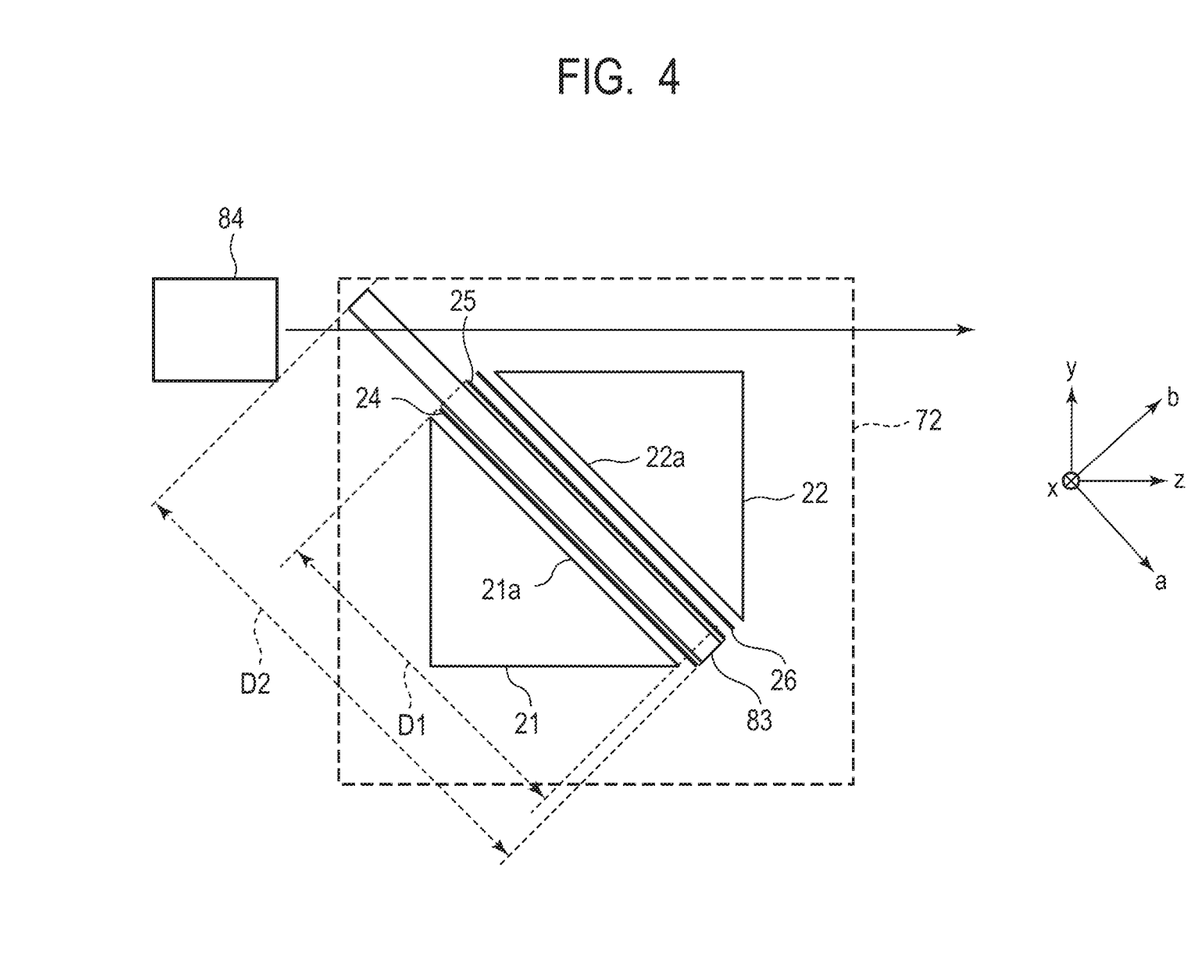
FIG. 4 is a diagram illustrating a configuration of a polarization beam splitter 72 in a Second Embodiment.

A configuration of a PBS 72, which is a polarization beam splitter in a Second Embodiment, will be described using FIG. 4.

The difference in configuration of the PBS 72 in this embodiment from the PBS 12 in the above-described First Embodiment is a substrate. In the PBS 72, a substrate 83 has such a size that the substrate 83 protrudes out of the first prism 21 and the second prism 22. In other words, the PBS 72 has a configuration that satisfies $$1.0 < D2/D1 < 1.5 \qquad (13)$$

where D1 denotes the length of the surface 21a of the first prism 21 in the direction of a diagonal of the PBS 72 and D2 denotes the length of the substrate 83. If the substrate 83 is too long to satisfy the upper limit value of Expression (13), this is not preferable because the substrate 83 possibly interferes with another member. Moreover, if the distance between the substrate 83 and a neighboring member is increased to avoid such interference, this is not preferable because the projector P is increased in size.

Such configuration makes it easier to dissipate heat from the polarizing beam split film 26 to the outside of the PBS 72 via the substrate 83 as compared with First Embodiment described above. As a result, it is possible to further suppress an increase in temperature of the polarizing beam split film 26. In addition, it is desirable that the substrate 83 protrude out of the PBS 72 by 5 mm or more. Note that the substrate 83 is made of a material having a high thermal conductivity, such as sapphire, as in the case of First Embodiment described above. In this embodiment, D1=28 mm, D2=D1+5 mm=33 mm, and D2/D1=1.18 (but any values of D1 and D2 meeting the requirements of Expression (13) may be used).

It is possible to cool down the temperature of the polarization beam splitter 72, and thus to further improve the optical performance, by blowing cooling air against the substrate 83 protruding out of the polarization beam splitter 72. That is, it is preferable that the projector P include a cooling portion 84 for cooling down at least a portion of the substrate 83 that protrudes out of the PBS 72. The solid arrow in FIG. 4 indicates the flow path of the cooling air from the cooling portion 84. The cooling portion 84 is a cooling fan such as a sirocco fan or an axial fan, for example.

Third Embodiment

A configuration of a projector P1 in a Third Embodiment will be described using FIG. 5. Since the configurations of the light source portion 11, the illumination optical system, the projection lens 9, and the retaining portion 9s are the same as those in First Embodiment described above, their description will be omitted. However, in this embodiment, a first condenser lens 39 and a second condenser lens 43 have the same functions as that of the condenser lens 6.

Figure 5:
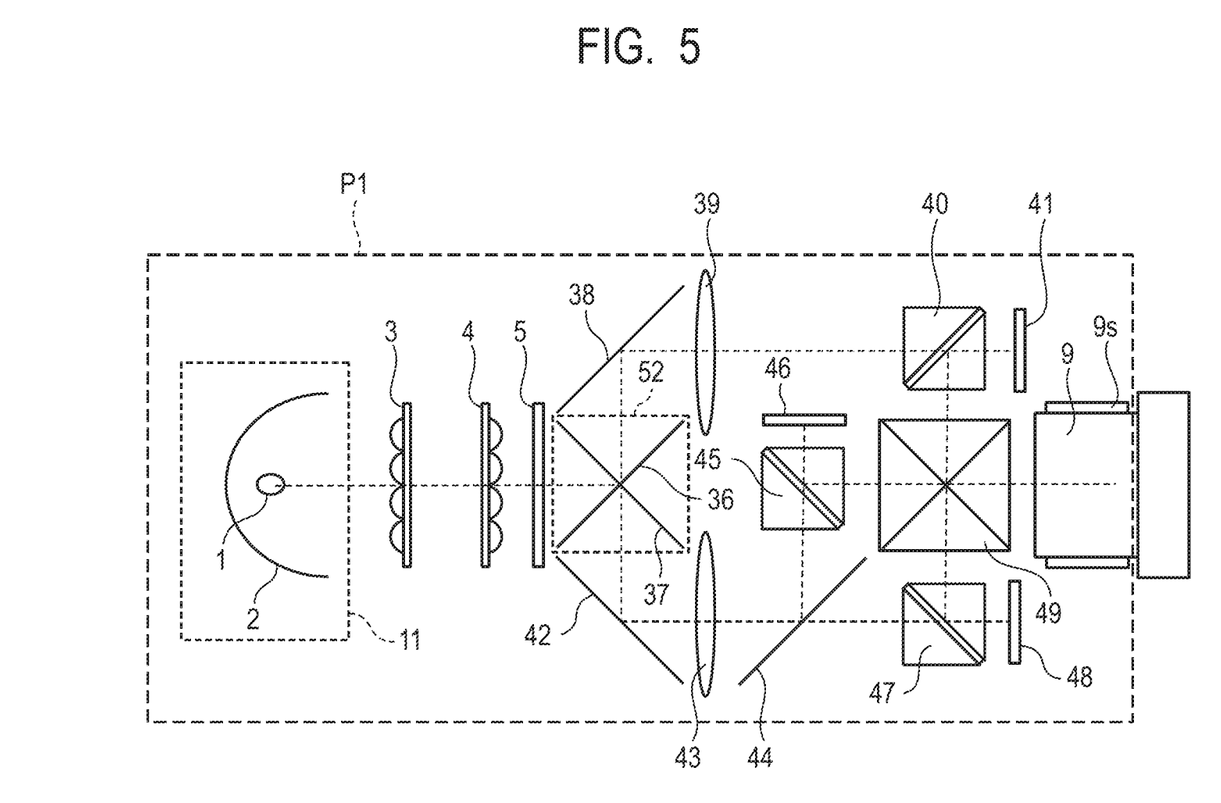
FIG. 5 is a diagram illustrating a configuration of an image projection apparatus in a Third Embodiment.

In FIG. 5, reference signs 40, 45, and 47 denote first, second, and third polarization beam splitters each having the same structure as that of the PBS 12 in First Embodiment described above. Reference signs 41, 46, and 48 denote first, second, and third refractive optical modulation portions, and more specifically first, second, and third reflective liquid crystal panel portions. Each of 41, 46 and 48 may also be referred to as first, second and third image display elements, respectively.

Light from an illumination optical system is incident on a cross dichroic mirror 52. The cross dichroic mirror 52 includes a first dichroic mirror 36 having properties of reflecting light in the blue band and transmitting light in the green band and light in the red band and a second dichroic mirror 37 having properties of transmitting light in the blue band and reflecting light in the green band and light in the red band. Light whose polarization has been converted to the P polarization in a polarization conversion element 35 is reflected by the cross dichroic mirror 52 such that light in the blue band is reflected to a direction of a first mirror 38 and light in the green band and light in the red band are reflected to a direction of a second mirror 42.

Note that, the light in the blue band, or blue light, mentioned herein is such that the wavelength or full width at half maximum (FWHM) of the light having the maximum intensity in the spectral distribution of the light is contained in the band of 430 to 480 nm. The light in the green band, or green light, is such that the wavelength or full width at half maximum (FWHM) of the light having the maximum intensity in the spectral distribution of the light is contained in the band of 500 to 580 nm. The light in the red band, or red light, is such that the wavelength or full width at half maximum (FWHM) of the light having the maximum intensity in the spectral distribution of the light is contained in the band of 600 to 750 nm.

The P polarized light in the blue band which has been emitted from the cross dichroic mirror 52 and reflected by the first mirror 38 passes through the first condenser lens 39 and the first PBS 40 and illuminates the first image display element 41. The image light (S-polarized light) which has been modulated by the first image display element 41 is reflected by the first PBS 40, is then reflected by a cross dichroic prism 49, and is guided to the projection lens 9.

The P polarized light in the green and red bands which has been emitted from the cross dichroic mirror 52 and reflected by the second mirror 42 passes through the second condenser lens 43 and is incident on a third dichroic mirror 44. The light in the green band is reflected by the third dichroic mirror 44 but the light in the red band passes through the third dichroic mirror 44.

The P polarized light in the green band which has been reflected by the third dichroic mirror passes through the second PBS 45 and illuminates the second image display element 46. The image light (S-polarized light) which has been modulated by the second image display element 46 is reflected by the second PBS 45, passes through the cross dichroic prism 49, and is guided to the projection lens 9.

The P polarized light in the red band which has passed through the third dichroic mirror 44 then passes through the third PBS 47 and illuminates the third image display element 48. The image light (S-polarized light) which has been modulated by the third image display element 48 is reflected by the third PBS 47, is then reflected by the cross dichroic prism 49, and is guided to the projection lens 9. The image light which has been guided to the projection lens 9 is projected onto a non-illustrated screen.

Note that although not illustrated in FIG. 5, it is desirable to arrange an absorption-type polarizing plate which absorbs light of an unnecessary polarization direction in an optical path between the first, second, and third PBSs and the cross dichroic prism 49.

In this embodiment, all the PBSs for the respective colors of light, each of which has the same configuration as that of the PBS 12, are arranged such that the image display elements for the respective colors of light are positioned in the directions in which the beams of incident light have passed through the respective PBSs. For this reason, as in the case of First Embodiment described above, it is possible in this embodiment as well to suppress the influence by the polarization beam splitters on the image quality while suppressing an increase in temperature in the polarization beam split portions, as compared with the conventional technique.

Note that in this embodiment, the cross dichroic mirror 52 is the color splitting portion, and the cross dichroic prism 49 is the color combination portion.

Fourth Embodiment

Figure 6:
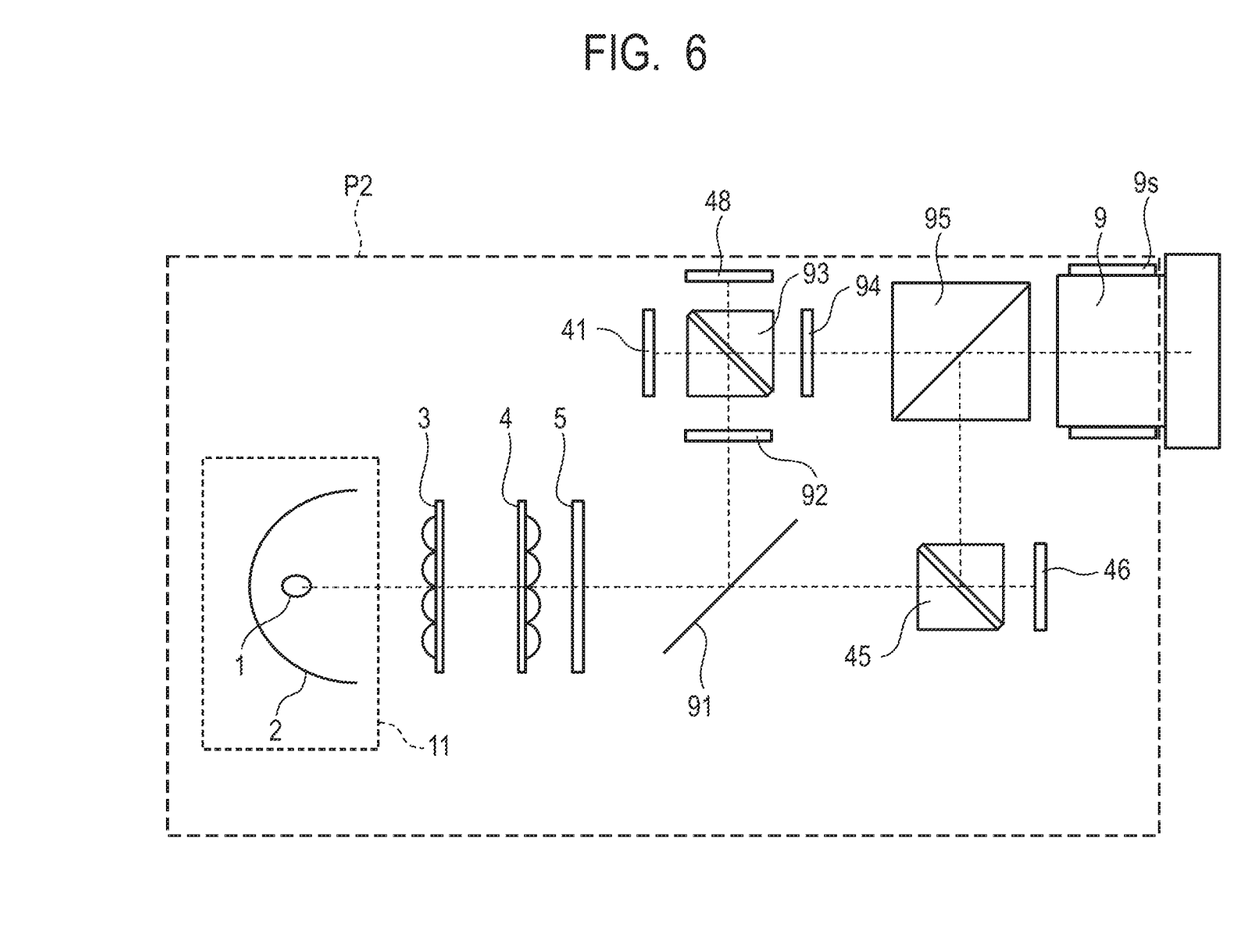
FIG. 6 is a diagram illustrating a configuration an image projection apparatus in a Fourth Embodiment.

A configuration of a projector P2 in Fourth Embodiment will be described using FIG. 6. Since the configurations of the light source portion 11 and the illumination optical system are the same as those in First Embodiment described above, their description will be omitted.

Light from an illumination optical system is incident on a dichroic mirror 91. The dichroic mirror 91 has properties of transmitting light in the green band and reflecting light in the red band and light in the blue band.

The light in the green band which has passed through the dichroic mirror 91 then passes through a second PBS 45 and is incident on a second image display element 46. The S-polarized light in the green band which has been modulated by the second image display element 46 is reflected by the second PBS 45, is then reflected by a synthesis prism 95, and is guided to a projection lens 9. The synthesis prism 95 has properties of reflecting light in the green band regardless of the polarization direction, transmitting light in the blue band regardless of the polarization direction, and polarization-splitting light in the red band.

The light in the red band and light in the blue band which have been reflected by the dichroic mirror 91 pass through a wavelength selective wave plate 92 such that only the light in the blue band is converted from the P polarized light to the S-polarized light, and are then incident on a fourth PBS 93. The fourth PBS 93 has functions of guiding S-polarized light in the blue band to the first image display element 41 while guiding P polarized light in the red band to the third image display element 48.

The P polarized light in the blue band which has been modulated by the first image display element 41 passes through the fourth PBS 93 and is converted to S-polarized light in the blue band through a λ/2 plate 94, which then passes through the synthesis prism 95 and is guided to the projection lens 9. Among the light in the red band which has passed through the fourth PBS 93 and been incident on the third image display element 48, the S-polarized light in the red band which has been modulated by the third image display element 48 is converted to P polarized light in the red band through the λ/2 plate 94, and is then guided to the projection lens 9 via the synthesis prism 95. Note that the fourth PBS 93 has the same configuration as that of the PBS 12 in First Embodiment described above.

In the fourth PBS 93, the light in the red band from the third image display element 48 is guided to the projection lens 9 without traveling via the substrate 23. On the other hand, the light in the blue band from the first image display element 41 is guided to the projection lens 9 via the two prisms and the substrate 23. In a case where two image display elements are arranged for one PBS, the effects described for the First Embodiment described above thus cannot be obtained for light of one color. Accordingly, in this embodiment, the third image display element 48 for red light, which has a higher relative visibility, is disposed in the direction in which the light passes through the fourth PBS 93. In this way, it is possible to reduce the influence of aberration, which the red light having a higher relative visibility receives.

[Modifications]

Although the preferred embodiments of the present invention have been described above, the present invention is not limited to these embodiments, and various modifications and variations may be made within the scope of the present invention.

For example, although the configurations in which the light source portion is a lamp have been illustrated in the above-described Embodiments, the present invention is not limited to such a configuration. As long as the light source portion is capable of emitting white light, the light source portion may be configured using a laser diode (LD) or LED that emits red light, an LD or LED that emits green light, and an LD or LED that emits blue light, for example. Further, the light source portion may be configured to emit white light by using yellow phosphor and an LD or LED that emits blue light.

In addition, although the configurations in which the polarization beam split portion is a polarizing beam split film, or more specifically a dielectric multilayer film have been illustrated in the above-described Embodiments, the present invention is not limited to such a configuration. As long as the polarization beam split portion separates incident light based on the polarization direction of the light, the polarization beam split portion may be, for example, a structured polarization beam split portion or the like instead of the dielectric multilayer film.

In addition, although the configuration in which the substrate 83 protrudes out of the PBS 72 in the direction of a diagonal of the PBS 72 in the y-z section has been illustrated in the above-described Second Embodiment, the present invention is not limited to such a configuration. It is possible to employ a configuration in which the substrate 83 protrudes out in the x-axis direction or a configuration in which the substrate 83 also protrudes in the y-z section and in the x-axis direction, and the like. Moreover, it is possible to employ a configuration in which the substrate 83 protrudes out of the PBS 72 on either side.

In addition, although the configurations using the first adhesive portion and the second adhesive portion have been illustrated in the above-described Embodiments, the present invention is not limited to such a configuration. For example, it is possible to employ a configuration in which the arrangement of the first prism, the substrate, the polarization beam split portion, and the second prism is fixed using a structure that urges one of the first prism and the second prism against the other.

In addition, the above-described First, Second, and Third Embodiments employ the configuration in which the image display element is positioned in the direction in which incident light on the PBS has passed through the polarization beam split portion. However, the present invention is not limited to such a configuration. For example, in the above-described First, Second, and Third Embodiments, it is possible to employ a configuration in which the image display element is positioned in a direction in which incident light on the PBS is reflected by the polarization beam split portion. In this case, the polarization direction to be regulated in the polarization conversion element may be changed to a polarization direction different by 90° from that of the above-described First, Second, and Third Embodiments.

In addition, in the above-described Fourth Embodiment, it is possible to employ a configuration in which the second image display element 46 is positioned in a direction in which green light incident on the second PBS 45 is reflected by the polarization beam split portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-191758, filed Sep. 29, 2017, which is hereby incorporated by reference herein in its entirety.

What is claimed is:

1. A polarization beam splitter comprising:
   a first prism;
   a second prism;
   a polarization beam split portion in contact with the second prism;
   a substrate provided between the polarization beam split portion and the first prism;
   a first adhesive portion provided between the first prism and the substrate; and
   a second adhesive portion provided between the polarization beam split portion and the substrate,
   wherein the following conditional expression is satisfied:

$$A \geq 4.0,$$

where A denotes a thermal conductivity (W/(m·K)) of the substrate.

2. The polarization beam splitter according to claim 1, wherein the polarization beam splitter is capable of guiding light that is incident on the first prism from a first direction through the polarization beam splitter to a refractive optical modulation portion, such that the light passes through the first prism, the first adhesive portion, the substrate, the second adhesive portion, the polarization beam split portion, and the second prism in this order, and wherein the polarization beam splitter is capable of guiding light that is modulated by the refractive optical modulation portion to a second direction different from the first direction.

3. The polarization beam splitter according to claim 1, wherein the polarization beam split portion is a polarizing beam split film vapor-deposited on a surface of the second prism on the substrate side.

4. The polarization beam splitter according to claim 1, wherein at least one of $$0.4 \leq H1 \leq 2.0 \text{ and}$$

$$0.4 \leq H2 \leq 2.0$$

is satisfied where H1 and H2 respectively denote thermal conductivities (W/(m·K)) of the first prism and the second prism.

5. The polarization beam splitter according to claim 1, wherein conditional expressions $$B1 \leq 2.0,$$

$$B2 \leq 2.0,$$

$$Q1 \leq 0.03, \text{ and}$$

$$Q2 \leq 0.03$$

are satisfied where B1 denotes a photoelastic constant ($10^{-6}$ mm$^2$/N) of the first prism, Q1 denotes an internal absorptance in a case where light having a wavelength of 460 nm is incident on the first prism having a thickness of 10 mm, B2 denotes a photoelastic constant ($10^{-6}$ mm$^2$/N) of the second prism, and Q2 denotes an internal absorptance in a case where light having a wavelength of 460 nm is incident on the second prism having a thickness of 10 mm.

6. The polarization beam splitter according to claim 1, wherein conditional expressions $$B1 \leq 2.0,$$

$$B2 \leq 1.0,$$

$$Q1 \leq 0.03, \text{ and}$$

$$Q2 \leq 0.02,$$

are satisfied where B1 denotes a photoelastic constant ($10^{-6}$ mm$^2$/N) of the first prism, Q1 denotes an internal absorptance in a case where light having a wavelength of 460 nm is incident on the first prism having a thickness of 10 mm, B2 denotes a photoelastic constant ($10^{-6}$ mm$^2$/N) of the second prism, and Q2 denotes an internal absorptance in a case where light having a wavelength of 460 nm is incident on the second prism having a thickness of 10 mm.

7. The polarization beam splitter according to claim 1, wherein a conditional expression $$B1 \geq B2$$

is satisfied where B1 denotes a photoelastic constant ($10^{-6}$ mm$^2$/N) of the first prism and B2 denotes a photoelastic constant ($10^{-6}$ mm$^2$/N) of the second prism.

8. The polarization beam splitter according to claim 1, wherein a conditional expression $$Q1 \geq Q2,$$

is satisfied where Q1 denotes an internal absorptance in a case where light having a wavelength of 460 nm is incident on the first prism having a thickness of 10 mm and Q2 denotes an internal absorptance in a case where light having a wavelength of 460 nm is incident on the second prism having a thickness of 10 mm.

9. The polarization beam splitter according to claim 1, wherein the substrate has birefringence, and
a conditional expression $$|Ne-No| \geq 0.004$$

is satisfied where Ne denotes a refractive index of the substrate for an ordinary ray of d-line and No denotes a refractive index of the substrate for an extraordinary ray of d-line.

10. The polarization beam splitter according to claim 1, wherein an angle made by a slow axis of the substrate relative to a polarization direction of incident light incident on the polarization beam split portion is within a range of 0°±5° or 90°±5°.

11. An image projection apparatus comprising:
a light source portion capable of emitting light containing a first color light beam, a second color light beam, and a third color light beam which have wavelengths different from each other;
a polarization beam splitter comprising:
   a first prism;
   a second prism;
   a polarization beam split portion in contact with the second prism;
   a substrate provided between the polarization beam split portion and the first prism;
   a first adhesive portion provided between the first prism and the substrate; and
   a second adhesive portion provided between the polarization beam split portion and the substrate,
   wherein the following conditional expression is satisfied:

$$A \geq 4.0,$$

where A denotes a thermal conductivity (W/(m·K)) of the substrate;
a refractive optical modulation portion; and
a retaining portion capable of retaining a projection optical system that guides light from the refractive optical modulation portion to a projection surface,
wherein the polarization beam splitter is arranged such that light from the light source portion passes through the polarization beam splitter and is incident on the refractive optical modulation portion, and light modulated by the refractive optical modulation portion is reflected by the polarization beam splitter.

12. The image projection apparatus according to claim 11, further comprising:
a first refractive optical modulation portion that modulates the first color light beam, a second refractive optical modulation portion that modulates the second color light beam, and a third refractive optical modulation portion that modulates the third color light beam, as the refractive optical modulation portion;
a color splitting portion that guides one color light beam among the first color light beam, the second color light beam, and the third color light beam to a direction different from those of the other two color light beams; and a color combination portion that combines a light beam from the first refractive optical modulation portion, a light beam from the second refractive optical modulation portion, and a light beam from the third refractive optical modulation portion.

13. The image projection apparatus according to claim 12, further comprising:

a first polarization beam splitter that guides the first color light beam to the first refractive optical modulation portion, a second polarization beam splitter that guides the second color light beam to the second refractive optical modulation portion, and a third polarization beam splitter that guides the third color light beam to the third refractive optical modulation portion, as the polarization beam splitter, wherein the first polarization beam splitter is arranged such that the first color light beam passes through the first polarization beam splitter and is incident on the first refractive optical modulation portion, the second polarization beam splitter is arranged such that the second color light beam passes through the second polarization beam splitter and is incident on the second refractive optical modulation portion, and the third polarization beam splitter is arranged such that the third color light beam passes through the third polarization beam splitter and is incident on the third refractive optical modulation portion.

14. The image projection apparatus according to claim 12, further comprising:

a second polarization beam splitter that guides the second color light beam to the second refractive optical modulation portion and a fourth polarization beam splitter that guides the first color light beam to the first refractive optical modulation portion and guides the third color light beam to the third refractive optical modulation portion, as the polarization beam splitter.

15. The image projection apparatus according to claim 14, wherein the second polarization beam splitter is arranged such that the second color light beam passes through the second polarization beam splitter and is incident on the second refractive optical modulation portion, the fourth polarization beam splitter is arranged such that the third color light beam passes through the third polarization beam splitter and is incident on the third refractive optical modulation portion, and a relative visibility of the third color light beam is higher than a relative visibility of the first color light beam.

* * * * *